United States Patent
Dean et al.

(10) Patent No.: US 9,909,692 B2
(45) Date of Patent: Mar. 6, 2018

(54) CONDUIT SPACING AND MOUNTING SYSTEM AND METHOD

(71) Applicant: M.C. DEAN INC., Sterling, VA (US)

(72) Inventors: William H. Dean, Miami Beach, FL (US); Russell S Williams, King William, VA (US); Richard D. Nicholson, Glen Allen, VA (US)

(73) Assignee: M.C. DEAN INC., Sterling, VA (US)

( * ) Notice: Subject to any disclaimer, the term of this patent is extended or adjusted under 35 U.S.C. 154(b) by 0 days.

(21) Appl. No.: 14/980,447

(22) Filed: Dec. 28, 2015

(65) Prior Publication Data

US 2017/0184223 A1    Jun. 29, 2017

(51) Int. Cl.
*H02G 3/04* (2006.01)
*F16L 3/12* (2006.01)
*F16L 3/223* (2006.01)
*H02G 3/32* (2006.01)

(52) U.S. Cl.
CPC ............. *F16L 3/1211* (2013.01); *F16L 3/223* (2013.01); *H02G 3/045* (2013.01); *H02G 3/0431* (2013.01); *H02G 3/32* (2013.01)

(58) Field of Classification Search
USPC ............... 248/49, 56, 58, 62, 65, 68.1, 74.1; 439/99–110; 174/21 R, 24, 60, 64, 68.1
See application file for complete search history.

(56) References Cited

U.S. PATENT DOCUMENTS

| | | | |
|---|---|---|---|
| 1,047,159 A | 12/1912 | Bowers | |
| 1,062,372 A | 5/1913 | Swan | |
| 2,661,483 A * | 12/1953 | Tortorice | E03C 1/021 248/57 |
| 2,813,692 A * | 11/1957 | Breamer et al. | H01B 17/306 174/152 R |
| 2,938,692 A * | 5/1960 | Bosworth | F16L 3/10 248/68.1 |
| 3,414,220 A * | 12/1968 | Walker | F16L 3/2235 248/68.1 |
| 3,437,297 A | 4/1969 | Jirka et al. | |

(Continued)

FOREIGN PATENT DOCUMENTS

DE    4311190 A1    10/1994

*Primary Examiner* — Alfred J Wujciak
(74) *Attorney, Agent, or Firm* — Roberts Mlotkowski Safran Cole & Calderon P.C.

(57) ABSTRACT

A conduit spacing and mounting system and method are provided for prefabricating multilayered assemblies of conduits and mounting them end-to-end in a building. The system includes a pair of spacer plates, each having a same pattern of conduit-receiving openings, and a plurality of clamping assemblies, each including a bracket which is discrete from and individually attached to the spacer plate adjacent to one of the conduit-receiving openings. The clamping assemblies are oriented at different angles relative at different rows of the conduit-receiving openings to provide access for a clamp-tightening tool in the spaces between different rows of conduits. The use of spacer plates largely prevents lateral misalignments between the conduits, and the use of a separate bracket formed from a harder, stronger or thicker metal than the spacer plate greatly increases the strength and reliability of the clamping force applied to the conduits.

15 Claims, 8 Drawing Sheets

(56) References Cited

U.S. PATENT DOCUMENTS

| | | | |
|---|---|---|---|
| 5,971,329 A * | 10/1999 | Hickey | F16L 3/227 |
| | | | 248/316.7 |
| 5,992,802 A | 11/1999 | Campbell | |
| D489,960 S | 5/2004 | Grendahl | |
| 7,014,152 B2 | 3/2006 | Grendahl | |
| 7,926,766 B2 | 4/2011 | Tjerrild | |
| 2011/0186695 A1 | 8/2011 | Bourgeois | |
| 2011/0204202 A1 | 8/2011 | Masters et al. | |
| 2013/0112304 A1 | 5/2013 | Lanham et al. | |
| 2013/0152497 A1 | 6/2013 | Monden | |
| 2014/0007402 A1 | 1/2014 | Boyer | |
| 2014/0259610 A1 * | 9/2014 | Vrame | F16L 3/105 |
| | | | 29/428 |

* cited by examiner

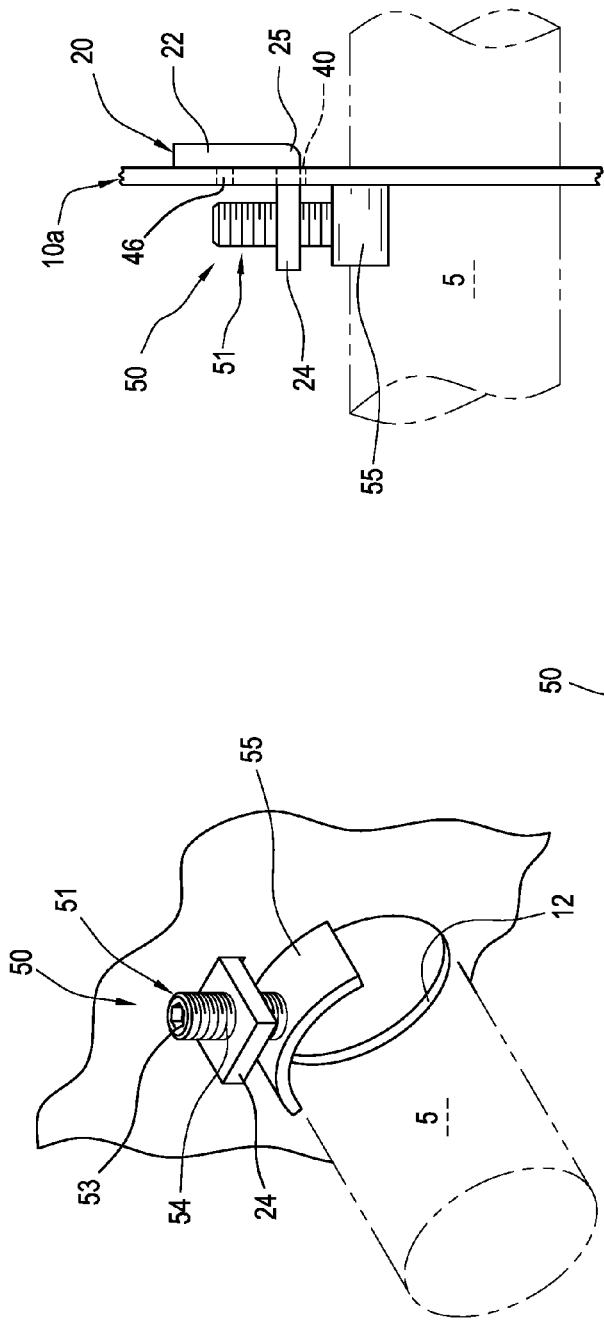
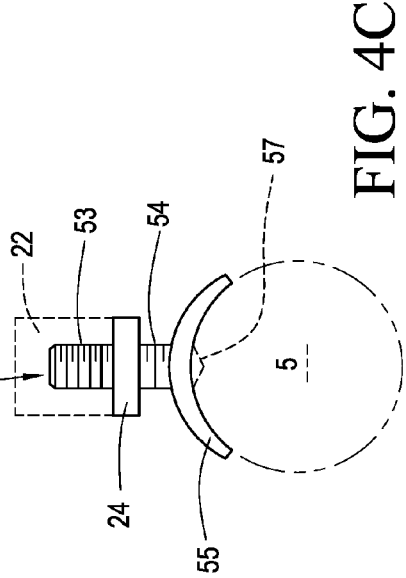
FIG. 4A
FIG. 4B
FIG. 4C

CONDUIT SPACING AND MOUNTING SYSTEM AND METHOD

FIELD

This invention generally relates to systems for mounting electrical conduits in a building, and is specifically concerned with a conduit spacing and mounting system for installing prefabricated, multiple-layered conduit assemblies in a building.

BACKGROUND

In order to expedite the installation of electrical conduits in modern buildings, relatively short lengths of such conduits (for example 10 feet) are first arranged and bound into prefabricated assemblies of one or more layers of spaced-apart conduits. These prefabricated conduit assemblies are subsequently transported to and installed on the underside of the roof or ceiling in a building under construction. During such installation, the conduit assemblies are serially aligned end-to-end and the abutting ends of the conduits of two different assemblies are coupled together to form a multiplicity of parallel, room-traversing electrical conduits.

The method most often used throughout the electrical industry for prefabricating the conduits into multiple-conduit assemblies and mounting them in a building is generally referred to as the "trapeze" system. In this system, a pair of rail-like struts having a row of uniformly-spaced clamps is used to secure the opposite ends of a row of perhaps five or six 10 foot conduits. Each of the rail-like struts has a "U" shaped cross-section into which a plurality of pairs of clamping straps may be slidably positioned. The bottom ends of each pair of clamping straps include recesses that slidably receive the rail-like edges of the struts, while the top ends include a bolt hole through which a clamping bolt is inserted. After sliding the ends of a series of conduits between the clamping straps, the clamping bolts of each of the pairs of clamping straps are tightened. Such bolt tightening pulls the top ends of the straps against the sides of the conduit while forcing the bottom ends of the straps outwardly into frictional engagement with the rail-like edges of the struts. The resulting conduit assemblies may be serially installed on the underside of the building roof or ceiling with the ends of the conduits in adjacent assemblies in alignment. Conduit couplings are then used to interconnect the abutting ends of the conduits of two adjacent conduit assemblies.

Conduit spacing and mounting systems which use spacer plates are also known in the prior art. The spacer plates in such systems have one or more rows of conduit-receiving, circular holes for receiving a conduit and maintaining it in a desired lateral position with respect to adjacent conduits. The conduits are secured against longitudinal movement relative to the plate openings by either a bendable tab that radially extends into the conduit-receiving holes and frictionally engages the conduit, or by a set screw mounted in a cantilevered flange provided along an edge of the spacer plate adjacent to the row of conduit-receiving holes.

SUMMARY

While the trapeze conduit spacing and mounting system is generally effective for its intended purpose, the inventors have observed a number of problems that compromise its over-all efficiency. For example, during installation, any misalignments between the conduits of two adjacent assemblies necessitates the three steps of loosening of the clamping straps holding the misaligned conduit, realigning the conduit, and then re-tightening the clamping straps. When the clamping straps are loosened, the conduits are free to move along two dimensions, i.e. both laterally along the axis of the strut, and longitudinally along their axes. Hence if the misalignment is only along the longitudinal axis of conduit, the technician installing the conduit assemblies must be careful to maintain the lateral alignment of the conduit while adjusting the longitudinal alignment, and vice versa. Unfortunately, need for such a re-alignment procedure occurs frequently as a result of misalignments caused by vibrations and other forces applied to the conduit assemblies during transport and installation. When the misalignments are along the longitudinal axes of the conduits, the clamping straps on both ends of the affected conduit have to be loosened and re-tightened after re-aligning the conduits, making it even more difficult to maintain the conduits in lateral alignment when retightening the clamping straps. The correction of such conduit misalignments adds substantially to the time and effort to install the conduit assemblies. Another problem with the trapeze system is the difficulty in prefabricating and installing conduit assemblies having multiple layers of electrical conduits. Even though multiple-layered assemblies can be formed by welding or bolting together two or more of the rail-like struts, the amount of additional labor and effort required is substantially more than that required for only single-layered assemblies. As the demand for ever denser arrays of electrical conduits has increased over time, this limitation has become more serious. Finally, the inventors have observed that the lack of any lateral play afforded by the tightened clamping straps can be problematical when assemblies of large-diametered conduits (1.25" trade size or larger) are coupled together. When the ends of two assemblies of small-diametered conduits are generally but not perfectly aligned in the lateral, side-to-side direction, the installer can usually slightly bend such conduits into alignment when coupling them together. However, when the ends of two assemblies of large-diametered conduits are not perfectly aligned, the rigidity of such large-diametered conduits may not allow the installer to bend them into alignment and may necessitate the time-consuming steps of loosening, aligning, and re-tightening the clamping straps.

While the inventors have recognized that the need for lateral re-alignment of the conduits in pre-fabricated assemblies might be solved by the use of spacer plates having a pattern of conduit-receiving, circular holes, the inventors have further noted that the prior art tabs and many of the set screw arrangements are incapable of reliably providing the clamping force required to secure the conduits against longitudinal movement. Upon close inspection, the inventors have observed that the cause of such failure is the formation of the bendable tabs or the cantilevered, set screw flanges out of the same material used to form the spacer plate. Such plates are formed from relatively soft, malleable steel in order to facilitate the punching and stamping processes by which they are manufactured. Consequently, when the friction tabs or cantilevered set screw tabs flanges are formed from the same relatively soft steel, they are likely to inelastically bend in reaction to the clamping forces they apply, causing the grip on the conduit to loosen when subjected to vibrations and other forces during transportation and installation. Substantial longitudinal misalignment is likely to occur, thereby necessitating an undesirable and time-consuming realignment step. And even if the flange-bending problem were solved by forming the flange separately from a stronger steel, it would be difficult for such a modified spacer plate to accommodate more than two rows of stacked rows of conduits due to the mechanical interference imposed by the previously-mounted conduits on the use of a screwdriver to tighten the set screws of the conduits in the middle rows.

Consequently, there is a need for an improved conduit spacing and mounting system that generally reduces the need for any re-alignment steps in the installation process, but which facilitates and expedites such a re-alignment step should it become necessary. Ideally, such a system should reduce the time required for the prefabrication and installation of conduit assemblies having multiple layers of electrical conduits. Finally, while such a system should be capable of securely and precisely mounting the conduits of each assembly into a desired position, it would be desirable if the system afforded some small amount of lateral movement or play to facilitate the coupling of the ends of two adjacent assemblies when the conduits were generally, but not precisely aligned.

To these ends, the conduit spacing and mounting system of the invention generally comprises at least one metallic spacer plate having a pattern of conduit-receiving openings, and a plurality of clamping assemblies, each of which includes a metallic bracket which is discrete from and individually attached to the spacer plate adjacent to one of the conduit-receiving openings of the spacer plate. A screw member is threadedly engaged to the bracket for generating a clamping force between the bracket and a conduit received within the adjacent opening such that a longitudinal position of the conduit with respect to the spacer plate can be adjusted by sliding the conduit into a desired position and tightening the screw member.

The use of a clamping assembly having a bracket which is discrete from and individually attached to the spacer plate advantageously allows the bracket to be formed from a stronger and more rigid material than the relatively soft and malleable steel that the spacer plate is preferably formed from. For example, the bracket can be formed from harder, stronger, and/or thicker steel than the spacer plate. Moreover, the use of a separate clamping assembly for each of the conduit-receiving openings allows the angular orientations of each of the clamping assemblies to be different for each row of the conduit-receiving openings. This feature in turn allows conduit assemblies having two or more rows of conduits to be easily assembled, as the clamping assemblies of different rows may be oriented at different angles to provide access for the shaft of a screwdriver or Allen wrench to extend through the spaces between different rows of conduits and engage and turn the screw members of the clamping assemblies.

The bracket of each of the clamping assemblies may include a mounting leg that is individually attached to the spacer plate, a screw member leg having a threaded hole for receiving the screw member, and a bent portion joining the mounting leg and screw member leg. The screw member leg may have a screw-socket side that the socket of the screw member extends from, and a screw-end side that the conduit-engaging end of the screw member extends from. The bent portion may be work-hardened for additional strength.

Each spacer plate may have a bracket-mounting slot adjacent to each of its conduit-receiving openings that receives a leg of the bracket such that one side of the bracket-mounting slot engages the screw-socket side of the screw member leg after the bracket is attached to the plate. The abutment of the screw-socket side of the screw member leg against a side of the bracket-mounting slot reinforces the bracket of the clamping assembly against a reactive bending force generated when the end of the screw member is forcefully engaged against the conduit. A weld hole is preferably provided adjacent to the slot which dead-ends into the weld leg of the bracket when the bracket is assembled to the plate. When the bracket is attached to the spacer plate by filling the weld hole with molten weld material, the heat from the weld is absorbed by the plate and the weld leg of the bracket, leaving the threaded hole in the screw member leg of the bracket undistorted by the welding process.

The end of the screw member may directly engage the conduit received within the adjacent opening. The end of the screw member may be tapered or include a protrusion to insure good electrical as well as mechanical contact with the side of the conduit. Alternatively, each clamping assembly may further include a clam-shell clamping member on the distal end of its screw member that directly engages the conduit received within the adjacent opening. The contacting surface of the clam-shell clamping member may likewise include a protrusion, ridge, tapered portion or other discontinuity to insure good electrical as well as mechanical contact with the side of the conduit.

The conduit-receiving openings of each spacer plate preferably have an inner diameter that is between about 5% and 15% larger than the outer diameter of the conduits received therein. If the conduit openings are too tightly fitted around the conduits, it becomes difficult to quickly insert the conduits through the openings, and there is insufficient clearance to allow the installer to laterally shift the ends of (in particular) rigid, large-diametered conduits into alignment with the ends of the matching conduits in an adjacent assembly. If the conduit openings are too loosely fitted around the conduits, longer screw members are necessary, and there is a greater chance that the screw members will engage the conduits off-center and undesirably displace them to one side or the other of the conduit-receiving opening. Providing the conduit-receiving openings with an inner diameter of between about 5% and 15% of the outer diameter of the conduits allows enough play between the conduits and the spacer plates to facilitate installation while avoiding the problems that arise when the conduit openings are too large relative to the conduits.

The conduit spacing and mounting system of the invention may also include an overhead mounting assembly that suspends the at least one spacer plate from an underside of a roof or ceiling of a building. The overhead mounting assembly may include at least one threaded rod for suspending the spacer plate from the underside of the roof or ceiling, and at least one clevis for attaching the spacer plate to the threaded rod.

The invention also encompasses a method of installing prefabricated conduit assemblies. In the first step of this method, a pair of spacer plates as previously described are spaced apart a distance equal to about one-half the length of the conduits with their conduit-receiving openings in alignment. Next, conduits are inserted through the aligned openings in the spaced-apart spacer plates and are longitudinally aligned such that the conduit ends are co-planar with approximately one-quarter the length of the conduits extending outside of each spacer plate. Steel or plastic banding is then wrapped around the conduits and tightened to temporarily secure the conduits from longitudinal shifting by pulling each one into frictional engagement with the edges of the spacer plate opening through which it extends. The resulting conduit assemblies are then transported to the building site and suspended from the roof-mounting assembly in end-to-end serial alignment. The banding is then cut, and the installer couples the ends of conduits of two adjacent assemblies via conduit couplings. This step is greatly facilitated by the fact that the screw members of the clamping assemblies have not yet been tightened, thereby allowing each conduit to freely slide relative to the spacer plates along its longitudinal axis. This step is further facilitated by the lateral play afforded by the difference between the outer diameter of the conduits and the inner diameter of the conduit-receiving holes. Finally, the screw members of the clamping assemblies are each tightened to secure the coupled conduits in place. Such tightening may also serve to electrically connect the conduits to the spacer plates in order to ground them. This final step is greatly facilitated by angularly orienting the clamping assemblies of different rows at different angles to provide clear access for the shaft of a screwdriver or Allen wrench to extend through the rows of conduits to the screw members of the clamping assemblies.

BRIEF DESCRIPTION OF THE DRAWINGS

FIG. 4A is perspective view of an alternative embodiment of the clamping assembly wherein the screw member includes a clam-shell clamp on its distal end;

FIGS. 4B and 4C are side and front views of the clamping assembly illustrated in FIG. 4A, respectively;

DETAILED DESCRIPTION OF A PREFERRED EMBODIMENT

Figure 1:
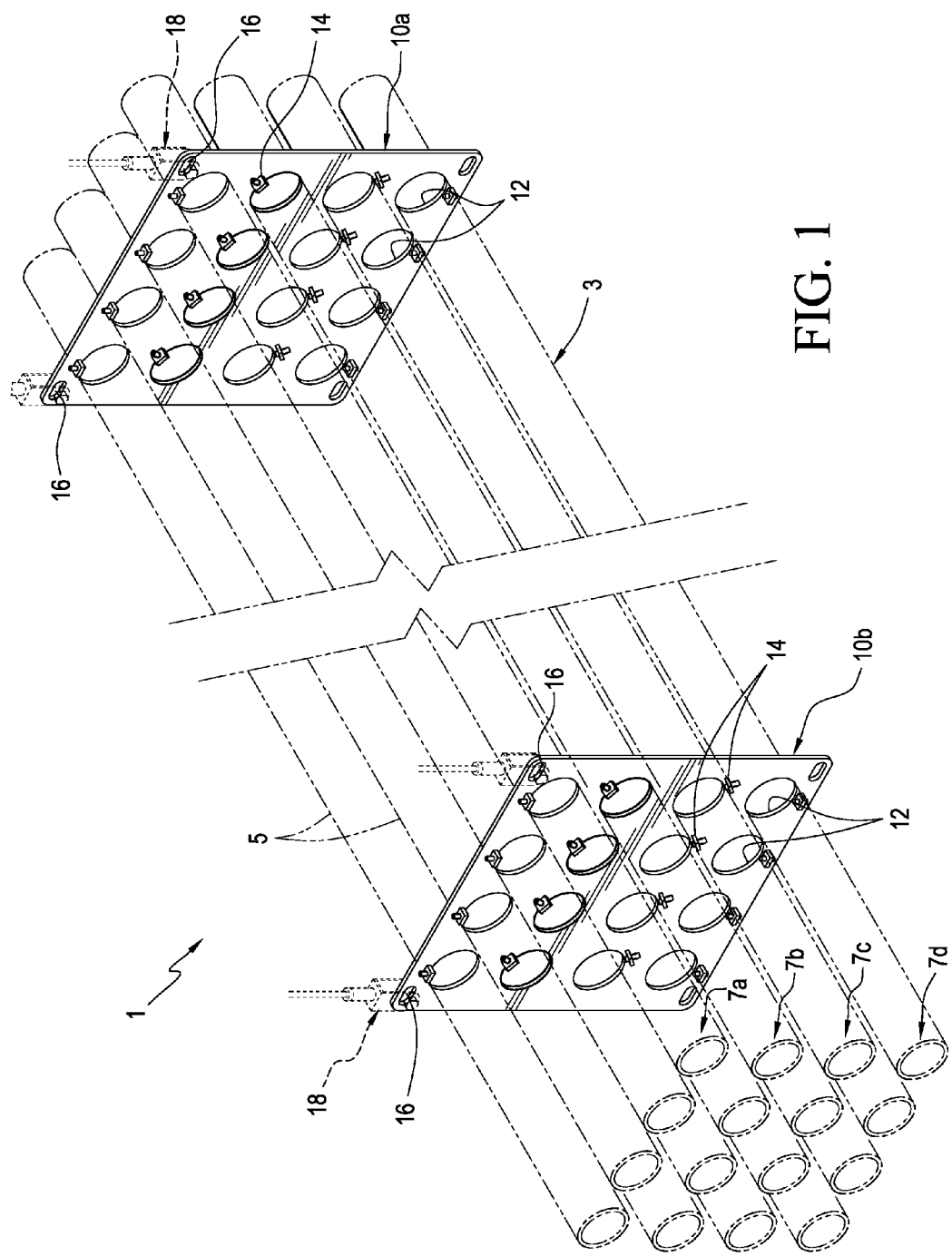
FIG. 1 is a perspective view of the conduit spacing and mounting system of the invention, illustrating in particular a prefabricated, multilayered conduit assembly formed by the system and how this assembly is suspended by the overhead mounting assembly of the system.
Figure 2:
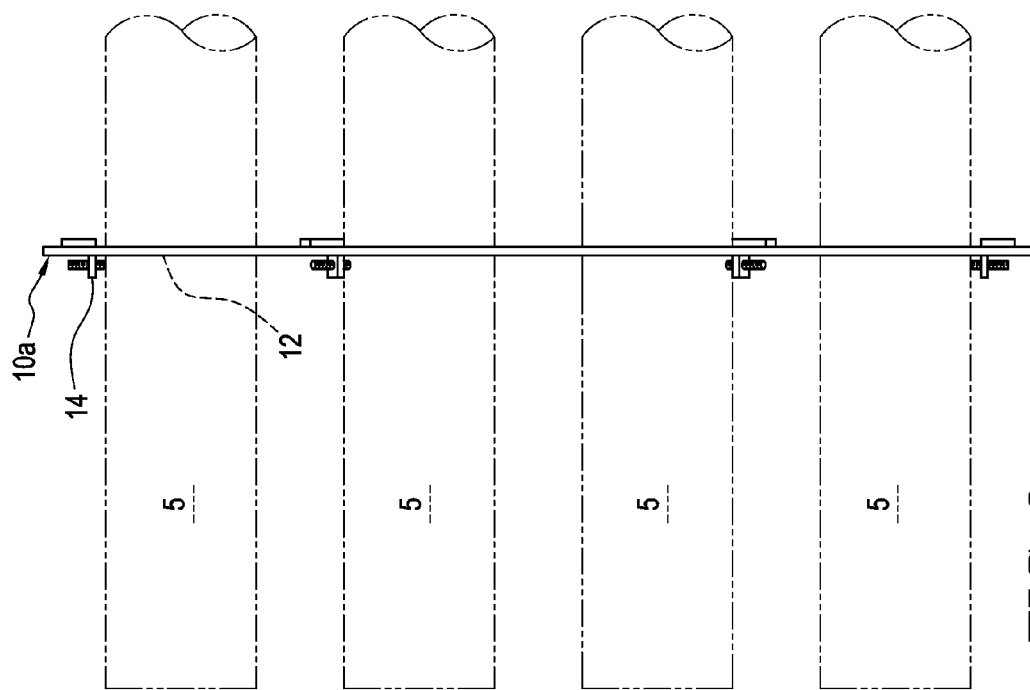
FIG. 2 is a partial side view of the conduit spacing and mounting system illustrated in FIG. 1.

FIGS. 1 and 2 illustrate the conduit spacing and mounting system 1 of the invention, which is useful in the prefabrication and installation of assemblies 3 of electrical conduits 5 having one or more layers or rows 7 of conduits 5. The system 1 includes a pair of spacer plates 10a, 10b, each of which has a same pattern of circular, spaced-apart conduit-receiving openings 12. The openings 12 may all be the same size and uniformly spaced-apart as shown. Alternatively, the openings 12 may be of different sizes to accommodate conduits 5 having different diameters, e.g. the opening diameters may be the same for each of the rows 7 but different between rows 7, or each row 7 may have openings 12 of differing diameters. In the preferred embodiment, the spacer plates 10a, 10b are each stamped from a 12 gauge sheet of mild steel, coated with a G90U galvanized finish. Spacer plates 10a, 10b are spaced apart from one another with their respective patterns of conduit-receiving openings 12 in alignment, and the conduits 5 are inserted through the aligned openings 12 as shown. In the preferred embodiment, the inner diameter of the conduit-receiving openings 12 are between about 5% and 15% larger than the outer diameter of the conduits 5. Such sizing facilitates the insertion of the conduits 5 through the openings 12, and provides some degree of lateral play between the conduits 5 and the openings 12. While not specifically shown in FIG. 1, the spacer plates 10a, 10b are preferably separated by a distance equal to about half of the conduit length, and the conduits 5 are symmetrically arranged lengthwise on these spaced-apart plates 10a, 10b in order to provide uniformly-spaced support points for the conduits 5 when the assemblies 3 are connected together. For example, if the conduits 5 are ten feet long, the plates 10a, 10b are preferably spaced five feet apart with two and a half feet of conduit length extending from each plate to the ends of the conduits 5. A separate clamping assembly 14 is attached next to each of the openings 12 in the plates 10a, 10b in order to clamp the conduit 5 against the inner edge of the openings 12. Suspension holes 16 are located in the corners of the spacer plates 10a, 10b to provide attachment points between the conduit assembly 3 and an overhead mounting assembly 18 that suspends the conduit assembly 3 from a ceiling or underside of a roof of a building.

Figure 3A:
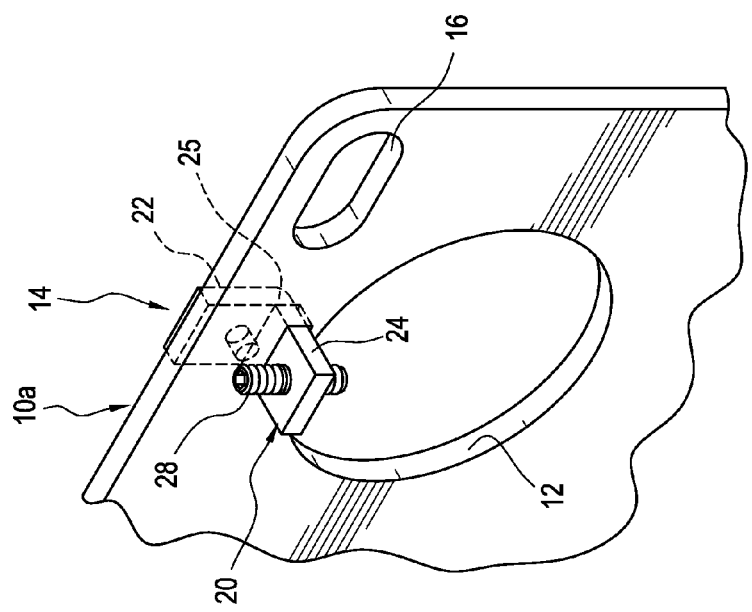
FIG. 3A is an enlarged view of one of the spacer plates of the system, illustrating in particular one of the upper-half conduit-receiving holes along with its respective clamping assembly.
Figure 3C:
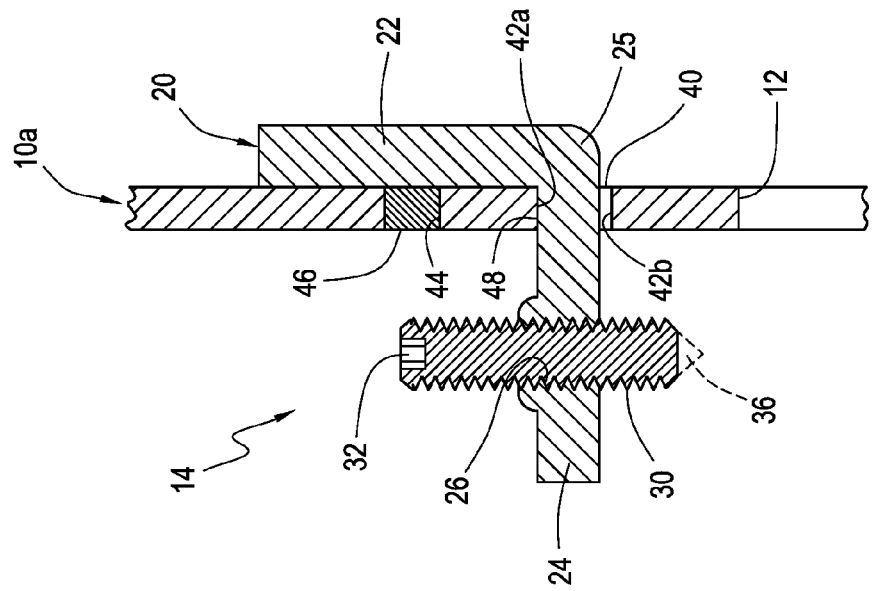
FIG. 3C is cross-sectional side view of the clamping assembly of FIG. 3A, illustrating how the bracket is partially reinforced by the upper side of the slot after being attached to the spacer plate via a weld joint.
Figure 3B:
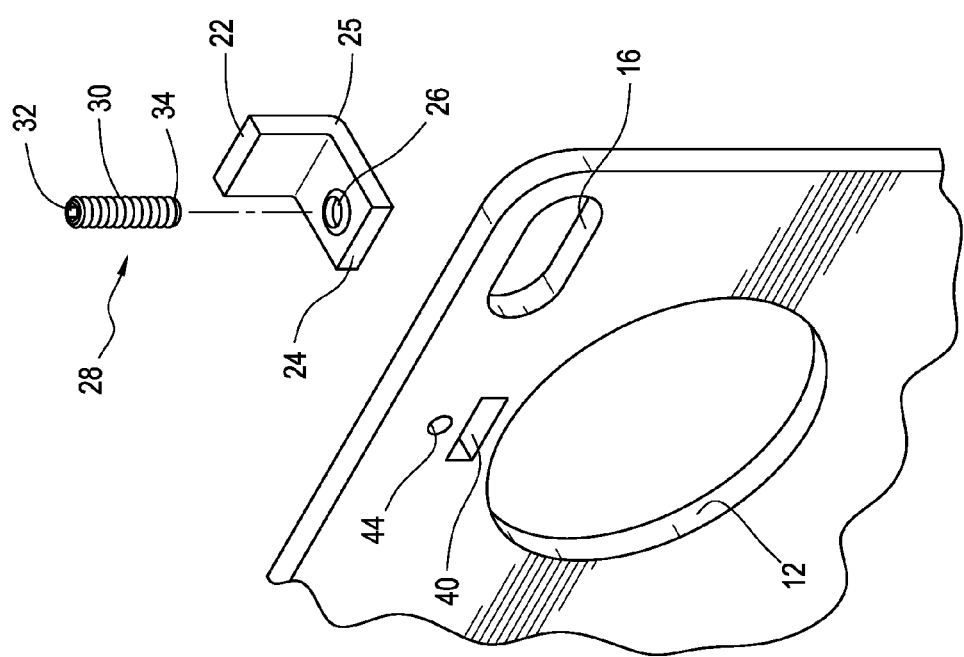
FIG. 3B is an exploded view of the clamping assembly of FIG. 3A, illustrating how the bracket of the clamping assembly is inserted through a slot in the plate prior to being welded thereto.

With reference now to FIGS. 3A-3C, each of the clamping assemblies 14 includes a generally L-shaped bracket 20 having both a mounting leg 22 and a screw member leg 24. Legs 22 and 24 are integrally joined at right angles via a bent portion 25. In this example of the invention, the bracket 20 is formed from ⅛" thick, low carbon steel that is stamped and bent so as to work-harden the bent portion 25, thereby increasing the strength and rigidity of the resulting clamping assembly 14. Preferably the bracket 20 is formed from a material that is both stronger and thicker than the material that forms the spacer plates 10a, 10b. In this example of the invention, the ⅛" thick, work-hardened low carbon steel that the bracket 20 is formed from is both 14% thicker and stronger than the 12 gauge mild steel that forms the spacer plates 10a, 10b. The screw member leg 24 includes a threaded screw hole 26 as is best seen in FIG. 3B that receives a clamping screw 28. As is best seen in FIGS. 3B and 3C, the clamping screw 28 includes a threaded shaft 30 having a hexagonal socket 32 on one end and a conduit-engaging clamping surface 34 at its opposite end. As indicated in phantom in FIG. 3C, the clamping surface 34 may end in a conical protrusion 36 in order to more positively engage the outer wall of a conduit 5.

The manner in which the brackets 20 of the clamping assemblies 14 are attached to the spacer plates 10a, 10b is best understood with reference to FIGS. 3B and 3C. The spacer plates 10a, 10b have bracket-mounting slots 40 provided adjacent to each of the conduit-receiving openings 12. As shown in FIG. 3C, each slot 40 includes opposing sides 42a, 42b. The distance between the opposing sides 42a, 42b is large enough to allow both the mounting leg 22 and the bent portion 25 of the bracket 20 through the slot 40 in preparation for a welding operation described hereinafter. A weld-hole 44 is provided adjacent each of the bracket-mounting slots 40 on the side opposite to the opening 12 for receiving weld material 46 that securely and integrally attaches the bracket 20 to the spacer plate 10a. The weld material 46 is preferably the same mild steel alloy used to form the spacer plates 10a, 10b. During the assembly operation, the mounting leg 22 of the bracket 20 is inserted through the slot 40 and the screw-socket side 48 of the screw member leg 24 is held in abutment with the side 42a of the bracket-mounting slot 40 furthest from its conduit receiving opening 12 while the front face of the mounting leg 22 is held in abutment with the back face of the spacer plate 10a. The hole 44 is then filled with molten weld material. The resulting weld joint secures the bracket 20 of the clamping assembly in to the position illustrated in FIG. 3C, wherein the engagement between the screw-socket side 48 of the screw member leg 24 against the side 42a of the bracket-mounting slot 40 advantageously reinforces the bracket 20 against the reactive forces generated when the clamping screw 28 is tightly clamped into engagement with a conduit 5. While only one size of clamping assembly 14 is illustrated in the several Figures, clamping assemblies 14 having different-sized brackets 20 and clamping screws 28 may be used on the same spacer plate 10a, 10b for conduits 5 having diameters of substantially different sizes.

FIGS. 4A-4C illustrate an alternative embodiment 50 of the clamping assembly used in the system 1 of the invention. Here, the clamping screw 28 is replaced with a clamping member 51 having a hexagonal socket 53 on the upper end of a threaded shaft 54, and a clam shell clamp 55 rotatably connected to the lower end of the threaded shaft 54. As shown in phantom in FIG. 4C, a tapered protrusion 57 may be provided on the underside of the clam shell clamp 55 to more positively engage the outer wall of a conduit 5. The use of such a clam shell clamp 55 reliably and consistently secures a conduit 5 against the center of the opposing edge of its conduit-receiving opening 12, i.e. 180° opposite from the clamping member 51 of the assembly 50 even when the openings 12 are substantially larger than the outer diameter of the conduits accommodated therein (e.g. when the inner diameter of the opening 12 is on the order of 15% or more than the outer diameter of the conduit 5). Such reliable clamping action results from the arcuate engagement between the clam shell clamp 55 and the outer surface of the conduit 5 which prevents the conduit 5 from rolling over to one side or the other when the clamping member 51 is tightened. The ability to reliably clamp conduits 5 having substantially smaller diameters that the openings 12 advantageously allows the openings 12 of the spacer plates 10a, 10b to accommodate a broader range of conduit diameters. This in turn obviates the need for providing spacer plates 10a, 10b with custom-sized openings 12 for every available diameter of conduits. While the clamping assemblies 14 illustrated in FIGS. 1, 2 and 3A-3C are likewise capable of securing conduits 5 even when the opening 12 has a 15% larger diameter, the use of a clam shell clamp 55 more reliably centers such conduits 5 within their respective openings 12 in such a case than the use of a clamping screw 28.

Figure 5:
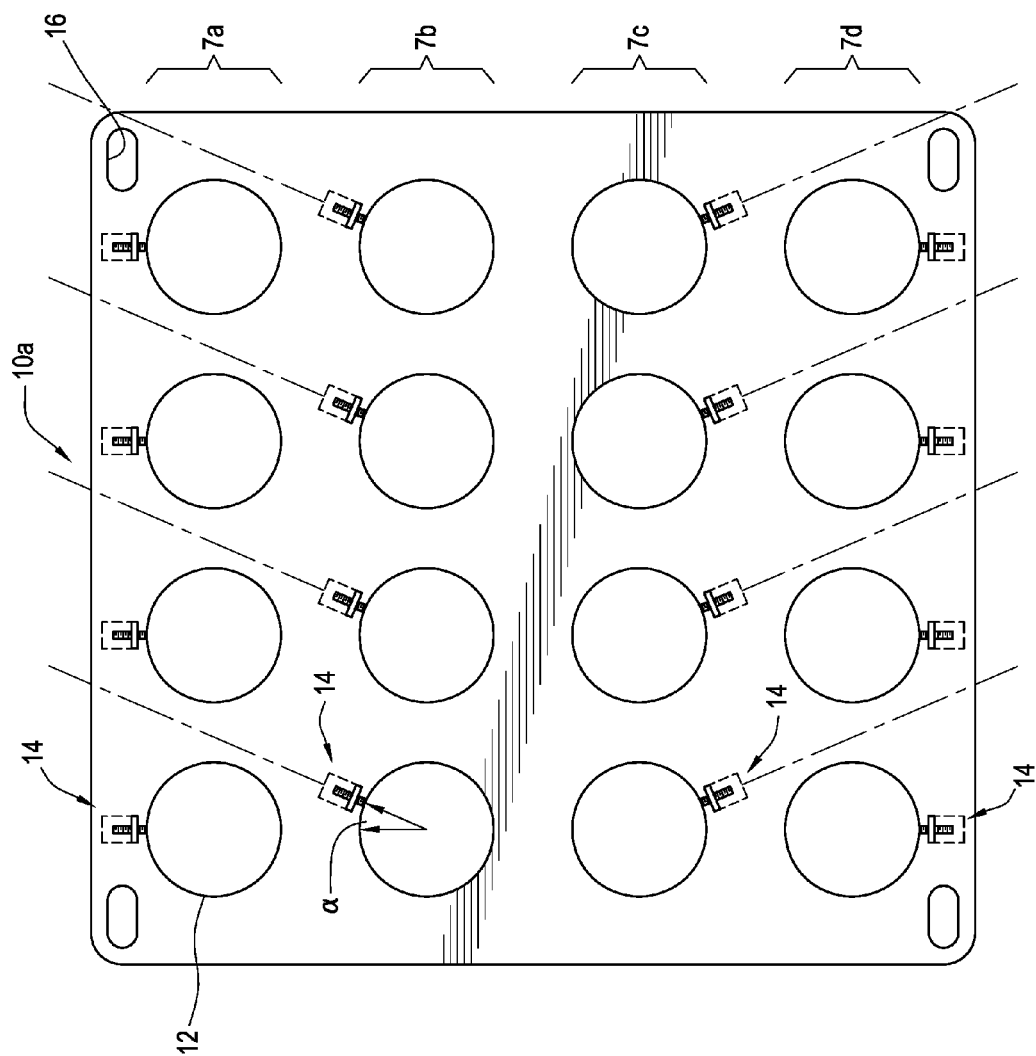
FIG. 5 is a front view of a spacer plate of the system, illustrating how the screw member leg of the bracket of the clamping assembly is inclined at different angles for different rows of conduit-receiving holes in order to provide access for the shaft of a screw turning tool for each of the clamping assemblies.

FIG. 5 illustrates how the clamping assemblies 14 may be positioned at different angles around the conduit-receiving holes 12 for different rows of the spacer plates 10a, 10b in order to provide access for a screw-turning tool. Specifically, for row 7a of the conduit-receiving openings 12, the clamping assemblies are all oriented at 12 o'clock (or 0°) relative to their respective circular openings 12. In mirror image thereto, for row 7d of the conduit-receiving openings 12, the clamping assemblies are all oriented at 6 o'clock (or 180°) relative to their respective circular openings 12. For both the rows 7a and 7d, the shaft of an Allen wrench can easily engage the hexagonal socket 32 of the screws 28 of each of the clamping assemblies 14. However, for rows 7b and 7c of the conduit-receiving openings 12, the clamping assemblies are all oriented at roughly 1 o'clock (20°) and 5 o'clock (70°) relative to their respective circular openings 12. As indicated by the dashed lines extending from the sockets of the screws 28 of each of the clamping assemblies 14 in these rows, the shaft of a screw-tightening tool can extend through the spaces between the conduits in rows 7a and 7d and engage the sockets 14 of the clamping screws 28. The fact that a separate clamping assembly 14 is attached adjacent to each of the conduit-receiving openings 12 allows the angle of orientation of the screws 28 relative to their associated openings 12 to be selected such that an Allen wrench or other elongated tool can obtain access to the screw-sockets without mechanical interference from the conduits 5 present in the adjacent rows. Such access is not possible in prior art designs wherein all of the clamping screws are mounted in a single flange or strut that overhangs an entire row of conduit-receiving openings. This advantage applies also when the alternative embodiment 50 of the clamping assembly is used.

Figure 6A:
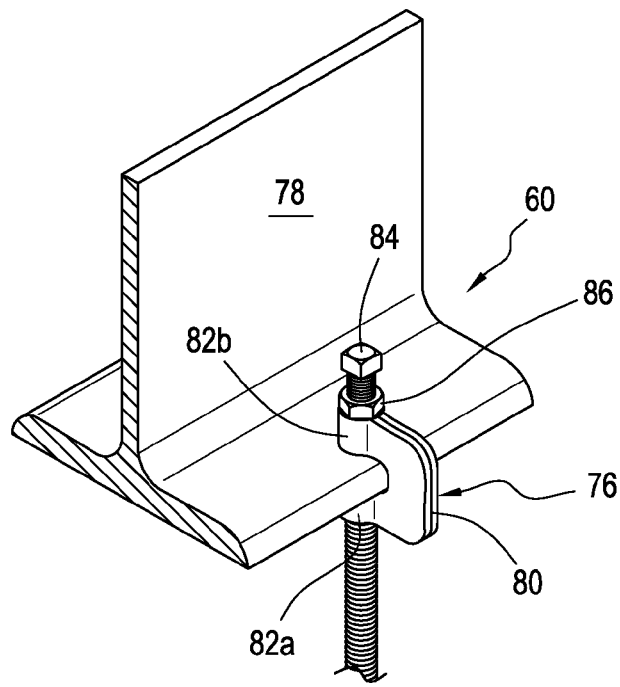
FIG. 6A is a perspective view of one of the connecting members of the overhead mounting assembly.
Figure 6A:
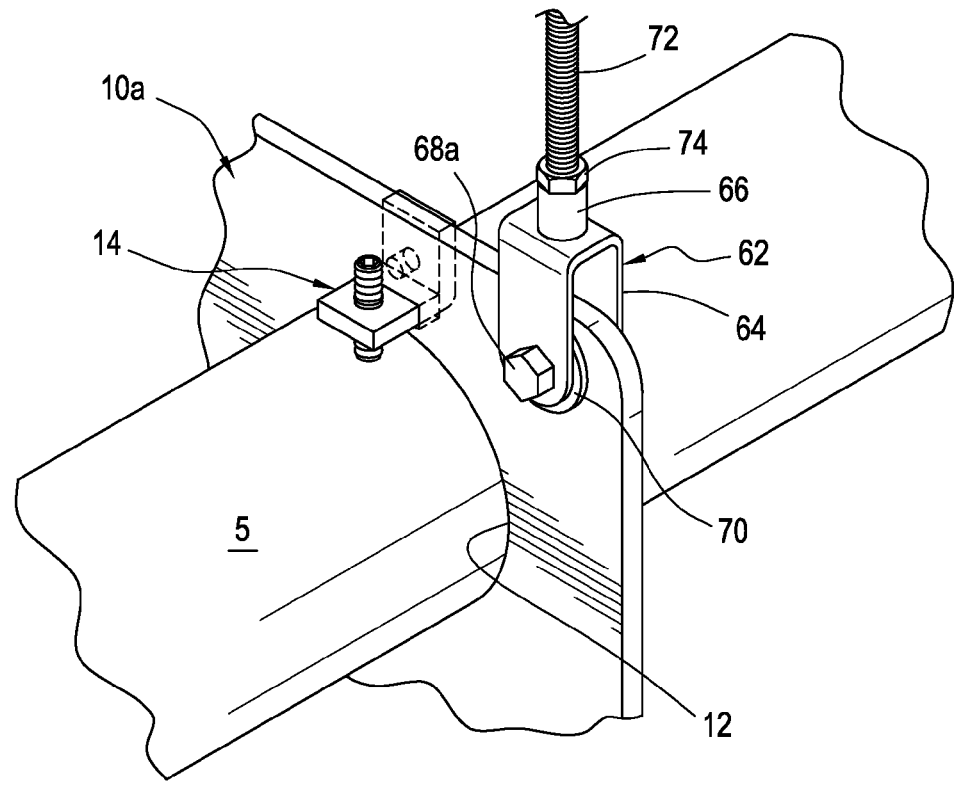
Figure 6B:
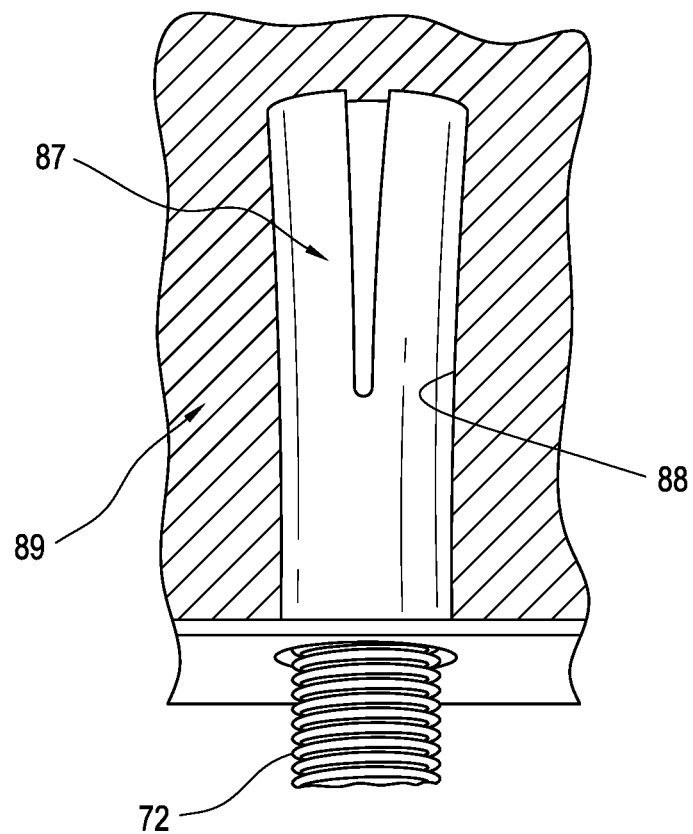
FIG. 6B is a partial side view of an alternative overhead mounting assembly wherein the connecting members are suspended from threaded anchors mounted in the underside of a concrete ceiling or roof.

FIG. 6A illustrates the connecting members 60 that form the overhead mounting assembly 18 of the system 1. Each of the connecting members 60 includes a clevis member 62 which is connected to one of the suspension holes 16 of the spacer plates 10a, 10b. The clevis member 62 includes a U-shaped portion 64 that the corner of the spacer plate 10a is sandwiched between, and a threaded socket 66. A bolt 68a that is capped by a nut (not shown) extends through a bolt hole present at the end of the U-shaped portion 64 and through one of the suspension holes 16 in order to connect the clevis member 62 to the spacer plate 10a. One or more washers 70 is disposed between the U-shaped portion 64 of the clevis member 62 and the suspension hole 16 to fill the gap between the clevis member 62 and the spacer plate 10a. The bottom end of a vertically-oriented threaded rod 72 is screwed into the socket 66 of the clevis member 62, and is secured thereto by lock nut 74. The top end of the threaded rod 72 is screwed into the bottom end of a beam clamp 76 which is in turn connected to a ceiling mounted framing member 78. To this end, the beam clamp 76 includes a C-shaped member 80 that receives one of the horizontally-oriented flanges of the framing member 78. Threaded openings 82a, 82b are provided at the bottom and top ends of the C-shaped member, respectively. The bottom threaded opening 82a receives the top end of the threaded rod 72 while the top threaded opening 82b receives a clamping bolt 84. Bolt 84 engages the top surface of the flange of the framing member 78 in order to secure the beam clamp 76 to the framing member 78. Lock nut 86 secures this clamping connection by locking the clamping bolt 84 in place. While the top end of the threaded rod 72 is suspended from a ceiling-mounted framing member 78 in this embodiment, it may also be screwed into a threaded anchor 87 that has been inserted into a hole 88 drilled into the underside of a concrete ceiling or roof 89, as is illustrated in FIG. 6B.

Figure 7:
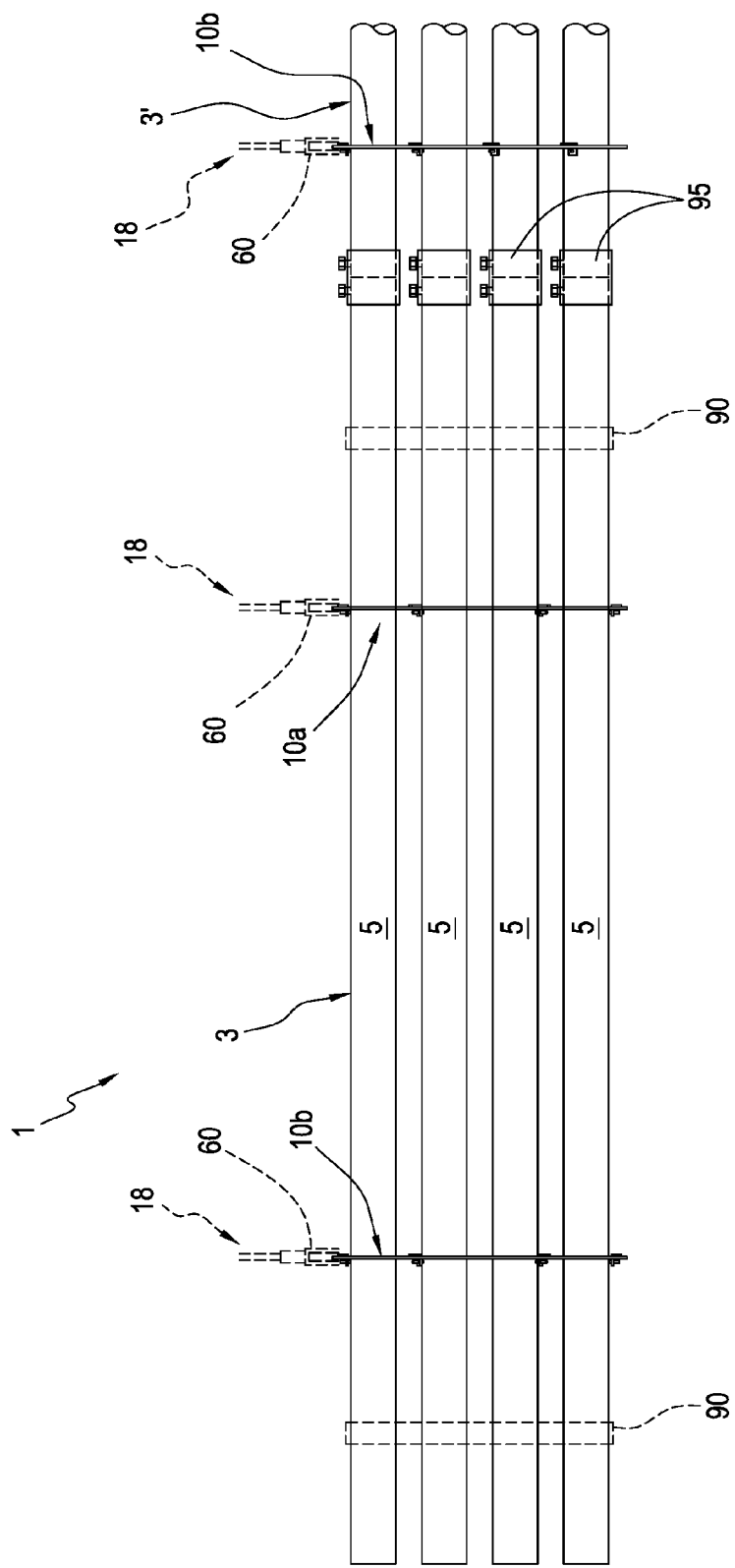
FIG. 7 is a side view of the conduit spacing and mounting system of the invention, illustrating in particular the method of installing the conduit assemblies of the invention.

The method of the invention may best be understood with respect to FIG. 7. In the first step of this method, the conduit assemblies 3 are prefabricated. To this end, pair of spacer plates 10a, 10b as previously described are inserted into a jig (not shown) which spaces them apart a distance equal to about one-half the length of the conduits 5, and aligns their respective patterns of conduit-receiving openings 12. If for example the conduits 5 are ten feet long, the plates 10a, 10b are spaced five feet apart in the jig. The conduits 5 are then inserted through the aligned pattern of openings 12 in the spacer plates 10a, 10b and are symmetrically arranged lengthwise with respect to the plates such that two and a half feet of conduit length extends from the front face of plate 10a and two and a half feet of conduit length extends from the back face of plate 10b. At the end of this step the conduits 5 are longitudinally aligned such that the conduit ends are co-planar. The conduits 5 are next temporarily secured to the spacer plates 10a, 10b to complete the formation of a conduit assembly 3. This may be done by wrapping and tightening steel or plastic banding 90 around the conduits 5 at either end of the assembly, which pulls the conduits 5 into frictional engagement with the edges of the particular openings 12 in the plates 10a, 10b through which they extend. In implementing this step, the banding 90 may be first wrapped around the interior four conduits extending through the plate 10a shown in FIG. 5, and then wrapped around the exterior twelve conduits 5 so that all of the conduits 5 are pulled into frictional engagement with their respective conduit-receiving openings 12 when the banding 90 is tightened and fastened. In an alternative embodiment of the method, the screw members 28 of each of the clamping assemblies 14 may be tightened after the conduits 5 have been inserted through the spacer plates 10a, 10b in the jig in order to form the conduit assemblies 3. However, this is not the preferred method of assembly of the conduit assemblies 3 due to the time required to access and tighten each screw member 28 of each clamping assembly 14 to form the assemblies 3.

In the next step of the method, the conduit assemblies 3 that have been pre-fabricated in the jig are transported to the building and are suspended from the underside of the ceiling or roof in end-to-end serial alignment via the connecting members 60 of the overhead mounting assembly 18. This is done by inserting the corners of each of the spacer plates 10a, 10b in the U-shaped portion 64 of the clevis members 62 provided at the ends of the connecting members 60, aligning the suspension holes 16 at each corner of the spacer plates 10a, 10b with the bolt hole present in the clevis members 62 and with washers 70, and inserting a bolt 68a through the aligned holes and washers 70. Bolt 68a is then capped by a nut (not shown).

After the assemblies 3 are suspended in end-to-end serial alignment, the installer then cuts the banding 90 wrapped around the ends of the conduits 5, which allows the conduits 5 to freely slide along their longitudinal axes with respect to the spacer plates 10a, 10b. The ends of the conduits 5 of the assembly 3 are slid into longitudinal alignment and abutment with the ends of the conduits 5 in the adjacent assembly 3', and the conduits 5 of the adjacent assemblies 3, 3' are interconnected via conduit couplings 95. These conduit alignment and interconnection steps are greatly facilitated by the fact that the screw members 28 of the clamping assemblies 14 have not yet been tightened, thereby allowing each conduit 5 to freely slide relative to the spacer plates 10a, 10b, along its longitudinal axis. These steps are further facilitated by the lateral play afforded by the 5% to 15% difference between the outer diameter of the conduits 5 and the inner diameter of the conduit-receiving holes 12 in combination with the lateral flexibility of the conduits 5.

Finally, the screw members 28 of the clamping assemblies 14 are each tightened to secure the inter-coupled conduits 5 in place. This final step is greatly facilitated by angularly orienting the clamping assemblies 14 of different rows 7a -7d at different angles relative to the openings 12 to provide a path between the rows of conduits 5 such that the shaft of a screwdriver or Allen wrench may be inserted to engage the sockets of the screw members 28 of the clamping assemblies 14 without mechanical interference. These method steps are repeated until all of the conduit assemblies 3, 3' are linearly interconnected.

Although the invention has been described in detail with particular reference to a preferred embodiment, it will be understood that variations and modifications can be effected within the spirit and scope of the invention. As previously indicated, the openings 12 of the spacer plates may have different sizes for the different rows 7a -7d to accommodate conduits 5 having different diameters. Conduit assemblies 3 may also be formed by inserting conduits 5 through only some of the conduit-receiving openings 12; hence a two or three-layered conduit assembly may be made from spacer plates 10a, 10b having four or more rows. Other modifications, variations, and additions to the invention will become apparent to persons of skill in the art, and all such modifications, variations, and additions are intended to be within the scope of this invention, which is limited only by the claims appended hereto and their various equivalents.

The invention claimed is:

1. A conduit spacing and mounting system, comprising:
   at least one metallic spacer plate having a pattern of conduit-receiving openings, and
   a plurality of clamping assemblies, each of which includes
      a metallic bracket which is discrete from and individually attached to the spacer plate adjacent to one of the conduit-receiving openings of the spacer plate, and
      a screw member threadedly engaged to the bracket for generating a clamping force between the bracket and a conduit received within the adjacent opening such that a longitudinal position of the conduit with respect to the spacer plate can be adjusted by longitudinally sliding the conduit through the opening into a desired position and tightening the screw member,
   wherein the pattern of conduit-receiving openings includes at least two vertically stacked rows of openings and the angular orientation of the clamping assemblies relative to the adjacent conduit-receiving opening is different between different rows, and
   wherein the screw member includes a distal end that contacts the conduit received within the adjacent opening.

2. The conduit spacing and mounting system defined in claim 1, further comprising an overhead mounting assembly that suspends the at least one spacer plate from an underside of a roof of a building.

3. The conduit spacing and mounting system defined in claim 1, wherein the bracket is formed from a harder, stronger or thicker metal than the spacer plate.

4. A conduit spacing and mounting system, comprising:
   at least one metallic spacer plate having a pattern of conduit-receiving openings, and
   a plurality of clamping assemblies, each of which includes
      a metallic bracket which is discrete from and individually attached to the spacer plate adjacent to one of the conduit-receiving openings of the spacer plate, and a clamping member engaged to the bracket for generating a clamping force between the bracket and a conduit received within the adjacent opening such that a longitudinal position of the conduit with respect to the spacer plate can be adjusted by longitudinally sliding the conduit through the opening into a desired position and tightening the clamping member, wherein the bracket of each of the clamping assemblies includes a mounting leg that is individually attached to the spacer plate, a clamping member leg including the clamping member, and a bent portion joining the mounting leg and clamping member leg, and wherein the spacer plate has a bracket-mounting slot adjacent to each of the conduit-receiving openings that receives the clamping member leg of the bracket such that a side of the bracket-mounting slot reinforces the clamping member leg against a reactive bending force generated when the clamping member generates a clamping force.

5. A conduit spacing and mounting system, comprising:
at least one metallic spacer plate having a pattern of conduit-receiving openings, and
a plurality of clamping assemblies, each of which includes
a metallic bracket which is discrete from and individually attached to the spacer plate adjacent to one of the conduit-receiving openings of the spacer plate, and
a screw member threadedly engaged to the bracket for generating a clamping force between the bracket and a conduit received within the adjacent opening such that a longitudinal position of the conduit with respect to the spacer plate can be adjusted by longitudinally sliding the conduit through the opening into a desired position and tightening the screw member, wherein the pattern of conduit-receiving openings includes at least two vertically stacked rows of openings, and wherein each clamping assembly further includes a clamshell clamping member on a distal end of its screw member that directly engages the conduit received within the adjacent opening.

6. A conduit spacing and mounting system, comprising:
at least a pair of metallic spacer plates, each of the plates having a same pattern of conduit-receiving openings;
a plurality of clamping assemblies, each of which includes
a metallic bracket which is discrete from and individually attached to the spacer plate adjacent to one of the conduit-receiving openings of the spacer plate, and
a screw member threadedly engaged to the bracket for generating a clamping force between the bracket and a conduit received within the adjacent opening such that a longitudinal position of the conduit with respect to the spacer plate can be adjusted by sliding the conduit into a desired position and tightening the screw member, wherein the pair of spacer plates include multiple rows of conduit-receiving openings, and the angular orientation of the clamping assemblies relative to the adjacent conduit-receiving opening is different between different rows, and wherein the screw member includes a distal end that contacts the conduit received within the adjacent opening.

7. The conduit spacing and mounting system defined in claim 6, wherein the bracket is formed from a harder, stronger, or thicker metal than the spacer plate.

8. The conduit spacing and mounting system defined in claim 6, wherein
the bracket of each of the clamping assemblies includes a mounting leg that is individually attached to the spacer plate via a weld joint, and a screw member leg having a threaded hole for receiving the screw member, and
wherein each spacer plate has a bracket-mounting slot adjacent to each of the conduit-receiving openings that receives the screw member leg of the bracket such that a side of the bracket-mounting slot reinforces the screw member leg against a reactive bending force generated when the screw member generates a clamping force.

9. The conduit spacing and mounting system defined in claim 6, wherein a distal end of the screw member directly engages the conduit received within the adjacent opening.

10. The conduit spacing and mounting system defined in claim 9, further comprising an overhead mounting assembly that suspends the at least one pair of spacer plates from an underside of a roof or ceiling of a building.

11. The conduit spacing and mounting system defined in claim 6, wherein the conduit-receiving openings are circular, and the pattern includes at least three vertically stacked rows of openings.

12. The conduit spacing and mounting system defined in claim 6, wherein the conduit-receiving openings of each spacer plate have a diameter that is between about 5% and 15% larger than the outer diameter of the conduits received therein.

13. A conduit spacing and mounting system, comprising:
at least a pair of metallic spacer plates, each of the plates having a same pattern of conduit-receiving openings;
a plurality of clamping assemblies, each of which includes
a metallic bracket which is discrete from and individually attached to the spacer plate adjacent to one of the conduit-receiving openings of the spacer plate, and
a screw member threadedly engaged to the bracket for generating a clamping force between the bracket and a conduit received within the adjacent opening such that a longitudinal position of the conduit with respect to the spacer plate can be adjusted by sliding the conduit into a desired position and tightening the screw member, wherein the pair of spacer plates include multiple rows of conduit-receiving openings, and, wherein each clamping assembly further includes a clamshell clamping member on a distal end of its screw member that directly engages the conduit received within the adjacent opening.

14. A conduit spacing and mounting system, comprising:
at least a pair of metallic spacer plates, each of the plates having a same pattern of conduit-receiving openings, and
a plurality of clamping assemblies, each of which includes
a metallic bracket which is discrete from and individually attached to the spacer plate adjacent to one of the conduit-receiving openings of the spacer plate, wherein the bracket includes a mounting leg that is individually attached to the spacer plate, a screw member leg having a threaded hole for receiving a screw member, and a bent portion integrally joining the mounting leg and screw member leg, and a screw member threadedly engaged to the threaded hole of the screw member leg for generating a clamping force between the bracket and a conduit received within the adjacent opening such that a longitudinal position of the conduit with respect to the spacer plate can be adjusted by sliding the conduit into a desired position and tightening the screw member, wherein each spacer plate has a bracket-mounting slot adjacent to each of its conduit-receiving openings that receives the screw member leg of the bracket such that a side of the bracket-mounting slot reinforces the screw member leg against a reactive bending force generated when the screw member generates a clamping force, and wherein the angular orientations of the brackets of the clamping assemblies relative to their respective conduit-receiving openings are different between each of the rows of openings to facilitate the use of a tool to engage and turn the screw members threadedly engaged to the screw member leg of the brackets.

15. A conduit spacing and mounting system, comprising:

at least one metallic spacer plate having a pattern of conduit-receiving openings, and a plurality of clamping assemblies, each of which includes a metallic bracket having a clamping member leg, the bracket being discrete from and individually attached to the spacer plate adjacent to one of the conduit-receiving openings of the spacer plate, and a clamping member engaged to the bracket for generating a clamping force between the bracket and a conduit received within the adjacent opening such that a longitudinal position of the conduit with respect to the spacer plate can be adjusted by longitudinally sliding the conduit through the opening into a desired position and tightening the clamping member, wherein the spacer plate has a bracket-mounting slot adjacent to each of the conduit-receiving openings that receives the clamping member leg of the bracket such that a side of the bracket-mounting slot reinforces the clamping member leg against a reactive bending force generated when the clamping member generates a clamping force.

* * * * *